(12) United States Patent  
Hasenberg et al.

(10) Patent No.: US 7,679,304 B2
(45) Date of Patent: Mar. 16, 2010

(54) INTERMITTENT WIPER CONTROL DEVICE (75) Inventors: Mark Hasenberg, Kenosha, WI (US); Richard M. Anton, Milwaukee, WI (US)

(73) Assignee: Hasenberg, Inc., Kenosha, WI (US)

( * ) Notice: Subject to any disclaimer, the term of this patent is extended or adjusted under 35 U.S.C. 154(b) by 218 days.

(21) Appl. No.: 11/852,785

(22) Filed: Sep. 10, 2007

(65) Prior Publication Data

US 2008/0061722 A1    Mar. 13, 2008

Related U.S. Application Data

(60) Provisional application No. 60/843,252, filed on Sep. 8, 2006.

(51) Int. Cl.
  *H02P 1/04* (2006.01)
(52) U.S. Cl. ................ 318/443; 318/445; 318/466; 318/DIG. 2
(58) Field of Classification Search ............... 318/443, 318/444, 445, 466, DIG. 2
  See application file for complete search history.

(56) References Cited

U.S. PATENT DOCUMENTS

| 4,158,159 | A | * | 6/1979 | Orris et al. ................. 318/443 |
| 4,339,698 | A | * | 7/1982 | Kearns ........................ 318/444 |
| 4,388,574 | A | * | 6/1983 | Bois et al. ................... 318/443 |
| 4,499,410 | A | * | 2/1985 | Iacoponi et al. ............. 318/444 |
| 4,544,870 | A | * | 10/1985 | Kearns et al. ............... 318/444 |
| 5,030,899 | A | | 7/1991 | Nishibe et al. |
| 5,525,879 | A | * | 6/1996 | Wainwright ................ 318/443 |
| 5,672,946 | A | | 9/1997 | Kawashima et al. |
| 5,694,011 | A | * | 12/1997 | Corey et al. ................. 318/444 |
| 5,694,012 | A | | 12/1997 | Pientka et al. |
| 5,726,547 | A | | 3/1998 | Reime |
| 5,811,950 | A | | 9/1998 | Lawson |
| 5,998,949 | A | | 12/1999 | Amagasa |
| 6,002,229 | A | | 12/1999 | Pientka et al. |
| 6,069,461 | A | | 5/2000 | Jaworski et al. |
| 6,072,295 | A | | 6/2000 | Kusunoki |
| 6,150,783 | A | | 11/2000 | Michenfelder et al. |
| 6,218,741 | B1 | | 4/2001 | Braun et al. |
| 6,441,327 | B1 | * | 8/2002 | Shibata et al. ........... 200/61.27 |
| 6,577,091 | B2 | * | 6/2003 | Yabe et al. .................. 318/443 |
| 6,800,978 | B2 | * | 10/2004 | Bohn ........................ 310/180 |

* cited by examiner

*Primary Examiner*—Rina I Duda
(74) *Attorney, Agent, or Firm*—Dicke, Billig & Czaja, PLLC

(57) ABSTRACT

An intermittent windshield wiper control device for use with antique or historical cars. The control device includes a user actuator mechanism, microprocessor circuitry, a potentiometer system, and a relay system. User movement of the actuator mechanism is translated to the potentiometer system to vary an output therefrom. The microprocessor circuitry acts in response to the potentiometer system output in controlling operation of a vehicle's wiper motor via the relay system.

20 Claims, 12 Drawing Sheets

INTERMITTENT WIPER CONTROL DEVICE

CROSS-REFERENCE TO RELATED APPLICATIONS

The subject matter of this application is related to the subject matter of U.S. Provisional Application Ser. No. 60/843,252, filed Sep. 8, 2006 and entitled "Intermittent Wiper Device," priority to which is claimed under 35 U.S.C. §119(e) and an entirety of which is incorporated herein by reference.

BACKGROUND

1. Technical Field

The disclosure relates to devices for actuating or controlling operations of a vehicle's windshield wiping or cleaning system. More particularly, the disclosure relates to a windshield wiper device for effectuating wiping of water, snow, sleet, debris, bugs, and the like from the windshield of a vehicle. Specifically, the disclosure is an intermittent windshield wiper control system that is able to be retrofitted to antique or historical cars so as to upgrade such cars to include an intermittent wiper operation.

2. Background Information

Since the invention of the automobile over a century ago, the vehicle operator has desired to have the ability to clean the windshield of the vehicle so as to better be able to see through it. Many wiper or wiper-like inventions exist. In addition, due to the frequency of the rain, sleet or snow that falls and lands on the windshield, it is known that different speeds of wiping are desirable and useful. Furthermore, it has been discovered years ago, that in addition to variable speed motors for the wiper which allow wiping of the windshield at different speeds, it is desirable to have an intermittent wiper which is one that works with a delay in between cycles thus working well in light rain conditions. However there are many antique or historical cars on the road that pre-date the factory installation of intermittent wipers and thus only have 1 or possibly 2 speed wiper systems, without any intermittent speed, where the speeds are motor speeds without any delay in between cycles.

SUMMARY

Aspects of the present disclosure relate to an intermittent wiper control system with a user actuation mechanism, microprocessor circuitry, a potentiometer system, and a relay system.

BRIEF DESCRIPTION OF THE DRAWINGS

Similar numerals refer to similar parts throughout the drawings.

DETAILED DESCRIPTION

Figures 1, 2:
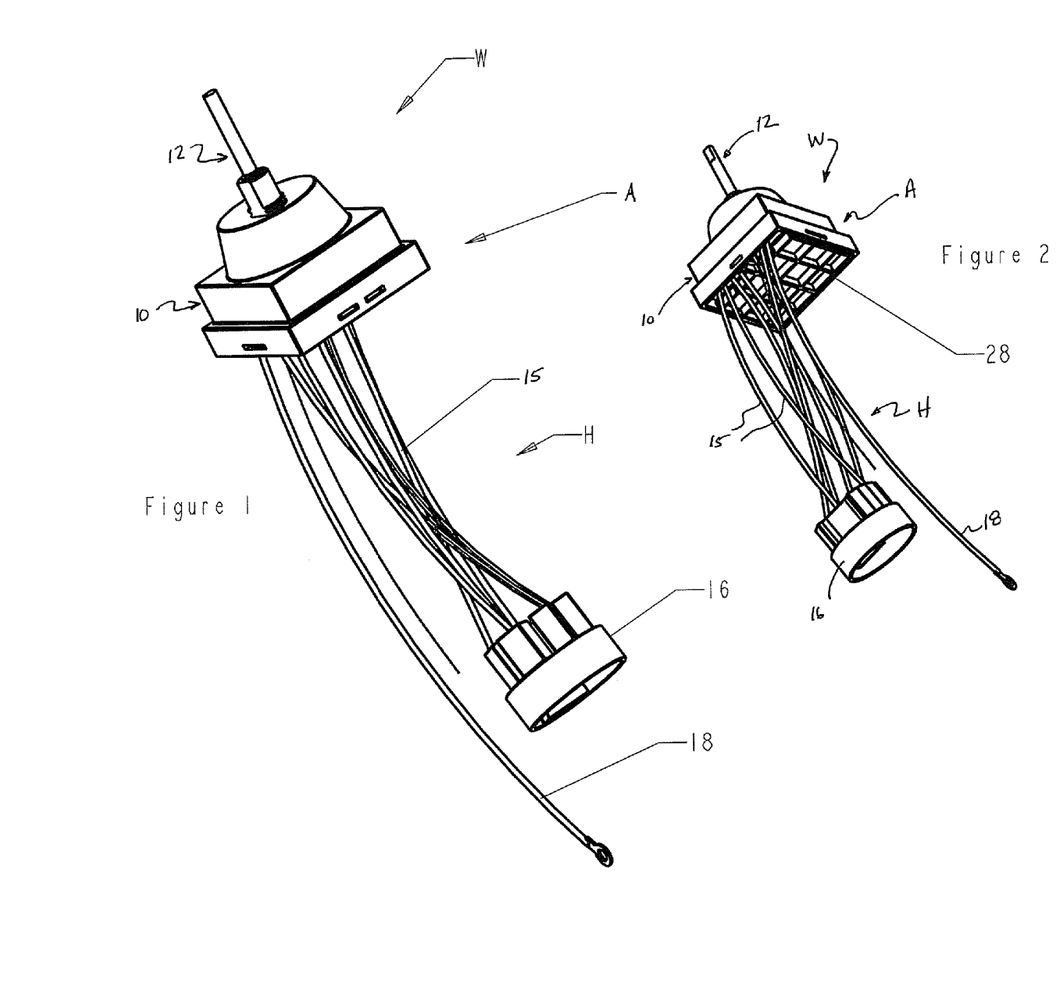
FIG. 1 is a top perspective view of the intermittent wiper control device of the present disclosure.
FIG. 2 is a bottom perspective view of the intermittent wiper control device of FIG. 1.

One embodiment of an intermittent windshield wiper control device is shown at W in FIG. 1. The control device W can be employed with virtually any vehicle having a windshield wiper system (e.g., a motor driving one or more wiper assemblies across the vehicle's windshield and an optional cleaning assembly including a motorized pump spraying cleaning liquid onto the windshield). However, the control device W is highly useful for retroactive fitting into collector, antique, or historical cars that did not come from the factory with any form of intermittent wiper control. The inventors have discovered that the electrical system in the cars in the 1950s and 1960s were typically designed without such intermittent wiper control features. Rather, the wiper motor control/actuators of these and other vehicles provide only an "on" or "off" setting (or possibly two or three specific wiper motor speed settings). Such design has not allowed for easy installation of a new intermittent control system using current technology. However, many collectors of these older cars desire to put more modern conveniences on the restored cars such as power brakes, power steering and intermittent wiper control.

In general, the intermittent windshield wiper control device W of the present disclosure includes a wiper control assembly A with a wiring harness H extending therefrom. As described in greater detail below, the control device W is microprocessor-based and as a result no mechanical switches are required to achieve intermittent wiper actuation/control. This is accomplished through the implementation of an onboard Analog to Digital converter and a potentiometer incorporating a variable resistor, which translate the operator's desired function from an angular position of a control knob (not shown). These potentiometer functions can include "OFF", "Variable Intermittent Operation", "Continuous Slow Speed", and "Continuous Fast Speed" when applied to a vehicle having a Dual Speed model wiper motor or "OFF", "Variable Intermittent Operation" and "Continuous Fast Speed" for when applied to a vehicle having a Single Speed model wiper motor. These various positions of the potentiometer are shown schematically in FIG. 9.

Figure 3:
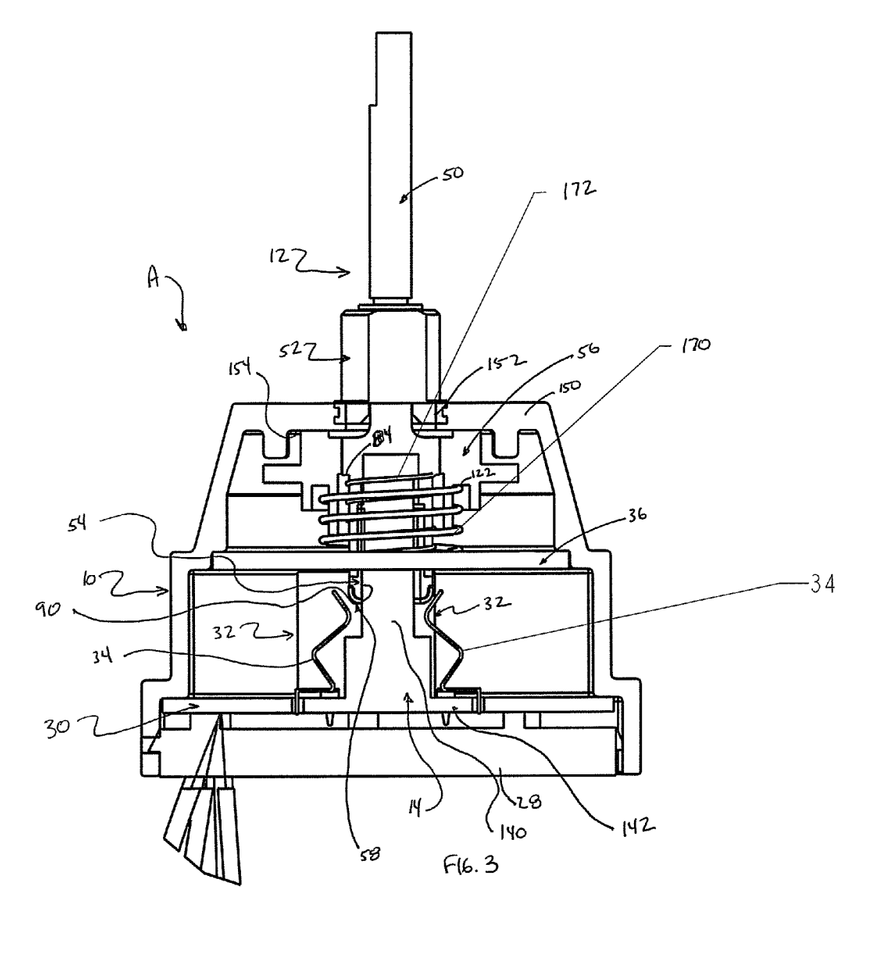
FIG. 3 is a sectional view of a portion of the intermittent wiper control device of FIG. 1.

The control device W that allows for such positions is shown in detail in FIGS. 1-8E. FIGS. 1-2 shows one embodiment of the present disclosure where the wiper control assembly A includes a housing or case 10 with a shaft mechanism 12 extending therefrom, and maintaining a potentiometer system 14 (FIG. 3). The wiring harness H includes a plurality of wires 15 extending to a plug 16 and a ground wire 18.

The control device W in this one embodiment replaces the current wiper control or actuation system in vehicles and in the process upgrades the existing system from one incapable of providing intermittent wiper operation to one that has multiple operations including intermittent use as well as one or more non-intermittent speeds.

The housing 10 maintains the shaft mechanism 12 as well as other components as described below. In this regard, the housing 10 is a hollow body with an end cap or case cover 28, as best shown in FIG. 2. Though not shown in the Figures, the control assembly A can further include a knob or similar body through which a user can effectuate desired operation of the control device W. The knob (or similar structure) is assembled to the shaft mechanism 12 (external the housing 10) and can include indicia instructing a user as to what operation will occur when the knob is rotated to certain positions. With reference to FIG. 3, in addition to the shaft mechanism 12, internal components of the control device W can include the potentiometer a circuit board 30 (providing microprocessor circuitry), one or more relays (collectively defining a relay system 32), one or more washer-board contacts 34, an optional insert disk 36. The shaft mechanism 12 includes, in some embodiments, a shaft 50, a keeper assembly 52, a shaft insulator 54, a rotator assembly 56, and a contact body 58. In general terms, the keeper assembly 52 retains the shaft mechanism 12 relative to the housing 10, with the shaft 50 translating a user-initiated rotational movement (via the knob (not shown)) to the potentiometer system 14 via interface with the shaft insulator 54. The rotator assembly 56 dictates a known relationship between rotational positioning of the shaft 50 and operation of the microprocessor circuitry, whereas the contact body 58 selectively interfaces with the washer-board contacts 34 to effectuate a cleaning operation (e.g., spraying of cleaning fluid).

Figure 4:
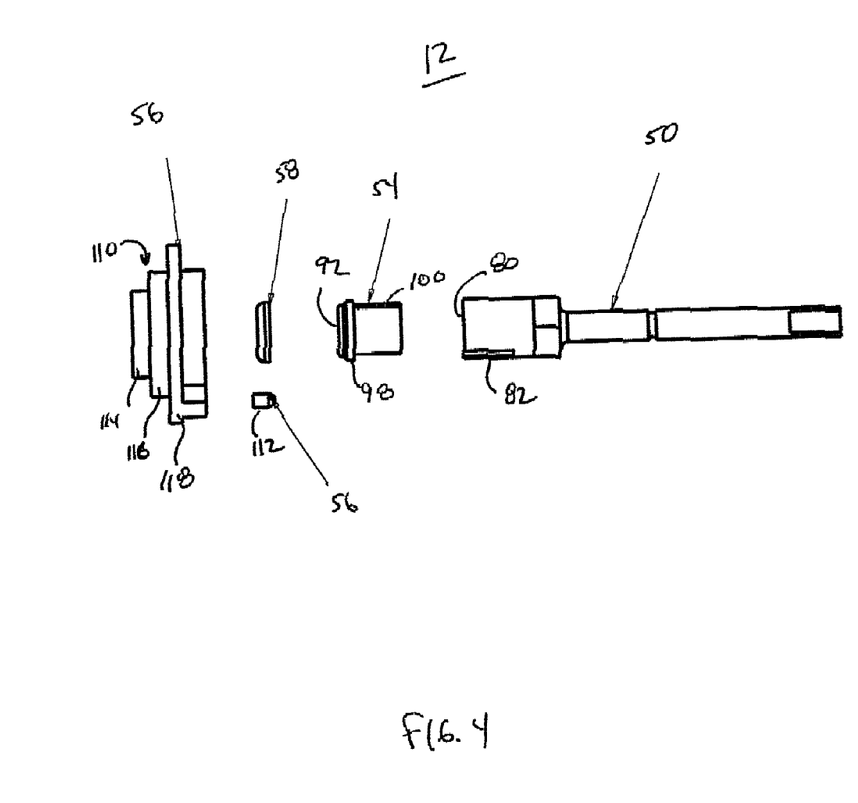
FIG. 4 is an exploded view of a shaft mechanism portion of the device of FIG. 3.
Figure 5A:
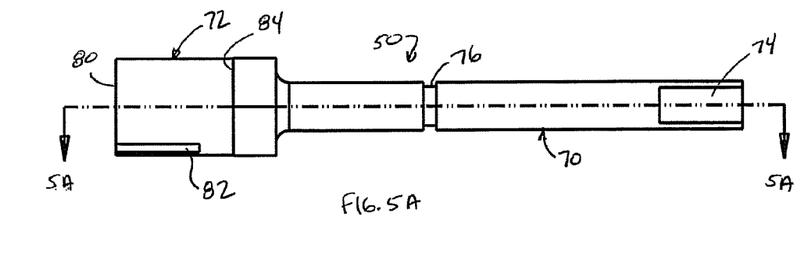
FIG. 5A is side view of a shaft of the shaft mechanism of FIG. 4.
Figure 5B:
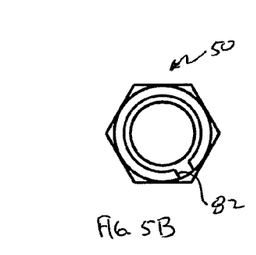
FIG. 5B is a first end view of the shaft of FIG. 5A.
Figure 5C:
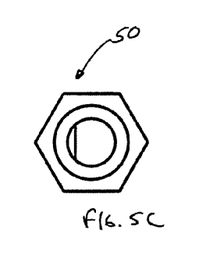
FIG. 5C is a second end view of the shaft of FIG. 5A.
Figure 5D:
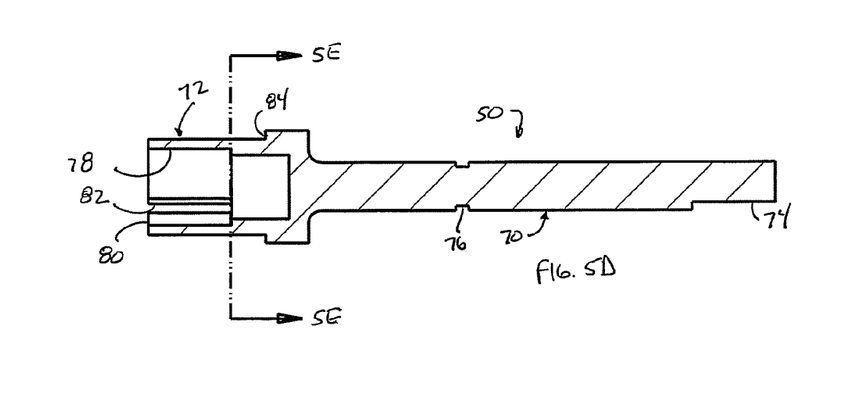
FIG. 5D is a sectional view of the wiper shaft taken along line 5D-5D in FIG. 5A.
Figure 5E:
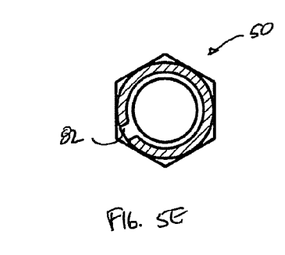
FIG. 5E is a sectional view of the wiper shaft taken along line 5E-5E in FIG. 5D.

The shaft mechanism 12 is shown in exploded form in FIG. 4, and can more generally be referred to as a user actuator mechanism. With additional reference to FIGS. 5A-5E, the shaft 50 is formed of a rigid material (e.g., metal) and forms or includes a leading segment 70 and a trailing segment 72. The leading segment 70 has a leading end 74 configured to receive the control knob (not shown) or similar user interface body, and thus can have, for example, an optional D-shape in transverse cross-section. Alternatively, other configurations useful for receiving a knob or other component are equally acceptable. In some embodiments, the leading segment 70 further forms a circumferential groove 76 adapted to facilitate mounting to the keeper assembly 52 (FIG. 3) as described below.

The trailing segment 72 has an outer diameter greater than that of the leading segment 70, and defines a central bore 78 extending from an open end 80. The bore 78 is sized to receive (e.g., frictionally maintain) the shaft insulator 54 (FIG. 3). As described below, the shaft insulator 54 has, in some embodiments, an orientational feature or shape that correlates with an orientational feature or shape of the potentiometer system 14 (FIG. 3). With this construction, a spatial position of the orientational feature of the shaft insulator 54/potientiometer system 14 relative to the shaft 50 is desirably constant. With this in mind, to better ensure desired positioning of the shaft insulator 54 relative to the shaft 50, the trailing segment 72 forms a longitudinal slot 82 that is sized in accordance with a corresponding portion of the shaft insulator 54 as described below. Finally, an exterior of the trailing segment 72 is preferably non-circular in transverse cross-section, and forms a radial stepped surface 84 for receiving a spring component of the assembly A.

Returning to FIG. 4 and with additional reference to FIGS. 6A-6E, the shaft insulator 54 is formed of an electrically non-conductive material (e.g., plastic), and is a generally ring-shaped body. In this regard, the shaft insulator 54 defines a central passage 90 extending between a first end 92 and a second end 94. At least a portion 96 of the passage 90 is defined by a non-circular shape, such as a D-shape as shown best in FIGS. 6B and 6D. The non-circular shape 96 serves as the orientational feature of the shaft insulator 54, and corresponds in size and shape with a component of the potentiometer system 14 as described below.

Figures 6A, 6B, 6C, 6D, 6E:
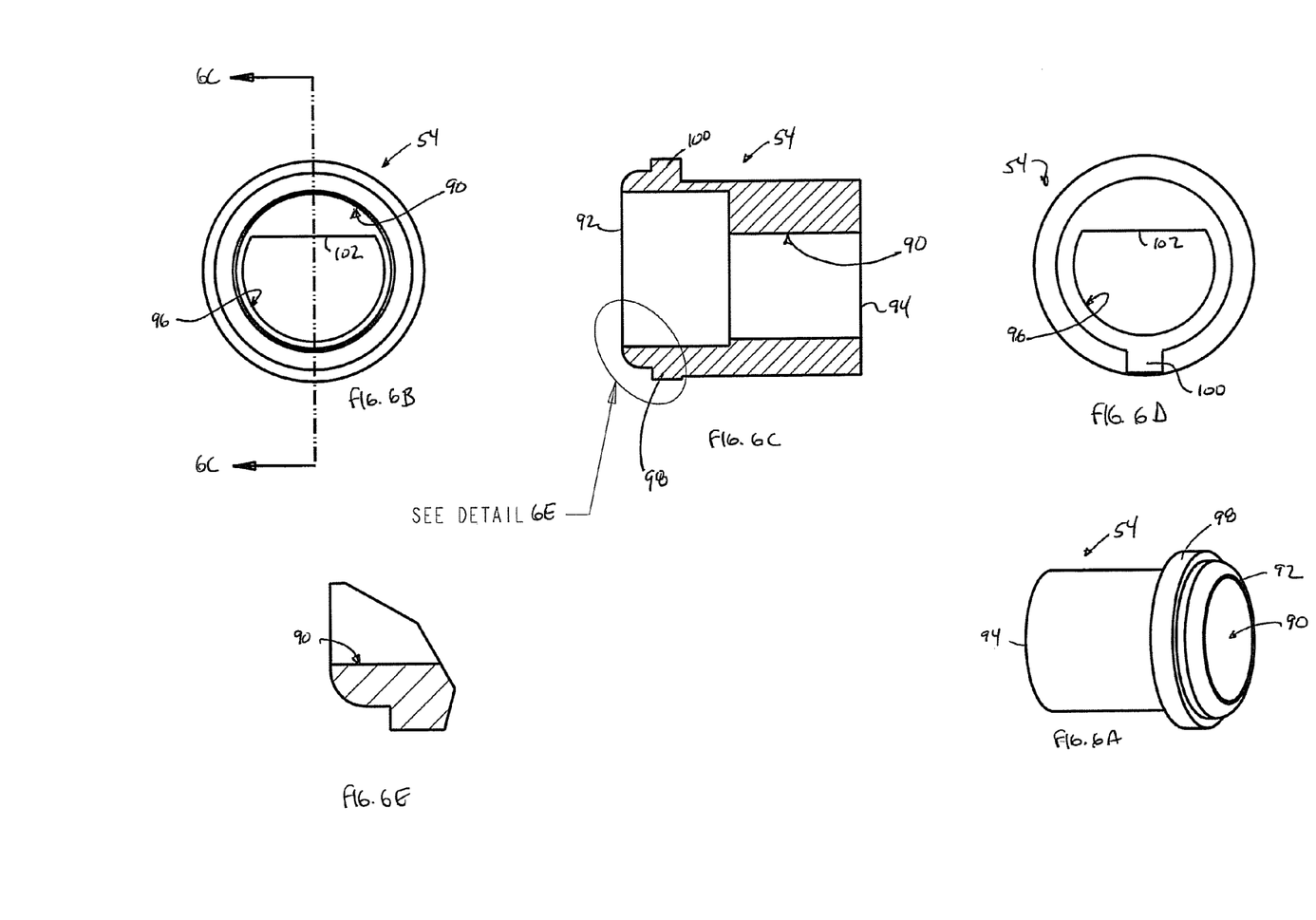
FIG. 6A is a perspective view of a shaft insulator part of the shaft mechanism of FIG. 4.
FIG. 6B is a first end view of the shaft insulator of FIG. 6A.
FIG. 6C is a sectional view of the shaft insulator taken along line 6C-6C in FIG. 6B.
FIG. 6D is a second end view of the shaft insulator of FIG. 6A.
FIG. 6E is a detailed view of the circled portion of FIG. 6C.

Relative to an exterior of the shaft insulator 54, a radial shoulder 98 is formed adjacent the first end 92, as well as a keying protrusion 100. The keying protrusion 100 is formed at a known location relative to the non-circular portion 96 of the passage 90 (e.g., opposite a linear region 102 of the non-circular portion 96), and is sized in accordance with the slot 82 of the shaft 50. This construction facilitates assembly of the shaft insulator 54 to the shaft 50 with the non-circular portion 96 at a known orientation.

Figure 7A:
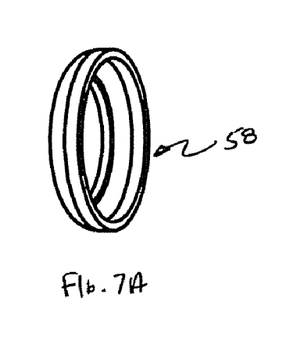
FIG. 7A is a perspective view of a contact body of the shaft mechanism of FIG. 4.
Figure 7B:
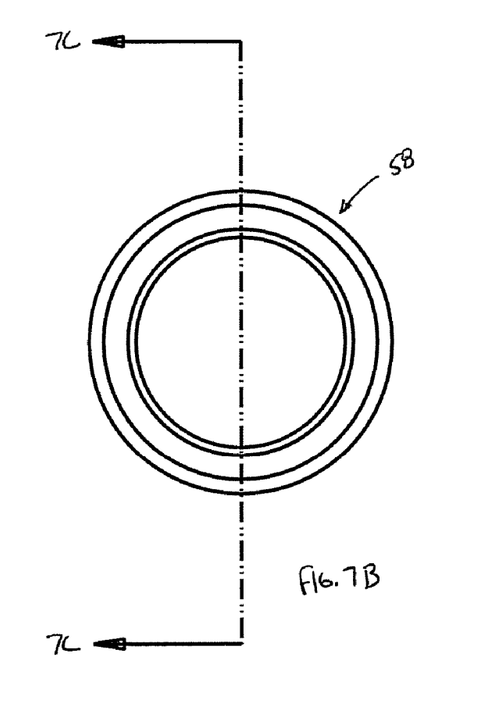
FIG. 7B is an end view of the contact body of FIG. 7A.
Figure 7C:
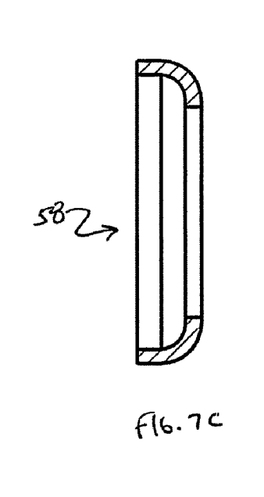
FIG. 7C is a sectional view of the contact body of FIG. 7A taken along line 7C-7C.

Returning to FIG. 4, and with additional reference to FIGS. 7A-7C, the contact body 58 is formed of an electrically conductive material and can have a cup-like shape. The contact body 58 is configured for assembly to the shaft insulator 54 and facilitates electrical connection between the washer-board contacts 34 as described below.

As best shown in FIGS. 4 and 8A-8E, the rotator assembly 56 includes, in some embodiments, a central body 110 and a detent pin 112. The central body 110 is annularly-shaped, and includes a first ring 114, a second ring 116, and a flange 118. The rings 114, 116 are co-axially arranged, with the first ring 114 defining a passageway 120 that extends through the central body 110. The passageway 120 is sized to receive and maintain the trailing segment 72 of the shaft 50, and thus has a corresponding shape (e.g., hexagonally-shaped). Further, the second ring 116 has a diameter greater than that of the first ring 114, with the rings 114, 116 being interconnected along an annular shoulder 122. Finally, the flange 118 projects radially from the second ring 116, and is configured to maintain the detent pin 112. In this regard, the detent pin 112 projects rearwardly from the flange 118 upon final assembly, and is sized to interface with corresponding guide feature(s) of the control device A as described below.

With continued reference to FIGS. 4 and 8A-8E, assembly of the user actuator or shaft mechanism 12 includes mounting the shaft insulator 54 within the bore 78 of the shaft 50. To this end, the keying protrusion 100 of the shaft insulator 54 is disposed within the slot 82 of the shaft 50 such that the non-circular portion 96 of the passage 90 of the shaft insulator 54 is orientated at a known spatial position relative to the shaft 50. Upon final assembly, the radial shoulder 98 of the shaft insulator 54 abuts the open end 80 of the shaft 50. Where desired, the shaft 50/shaft insulator 54 can be further affixed to one other via, for example, an adhesive.

The contact body 58 is assembled to the first end 92 of the shaft insulator 54. A variety of assembly techniques can be employed (e.g., frictional fit, adhesive, etc.). Further, the contact body 58 can be assembled to the shaft insulator 54 prior to assembly of the shaft insulator 54 to the shaft 50. Regardless, upon final assembly, the shaft insulator 54 electrically isolates the contact body 58 and the shaft 50.

Figure 8A:
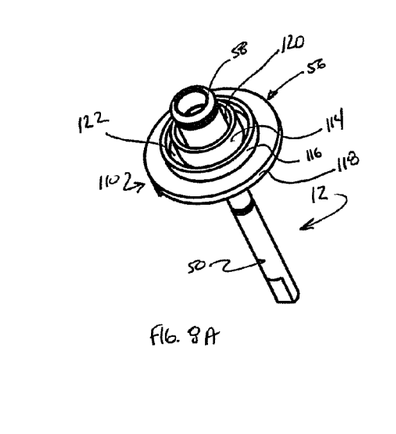
FIG. 8A is a perspective view of the shaft mechanism of FIG. 4 upon final assembly.
Figure 8B:
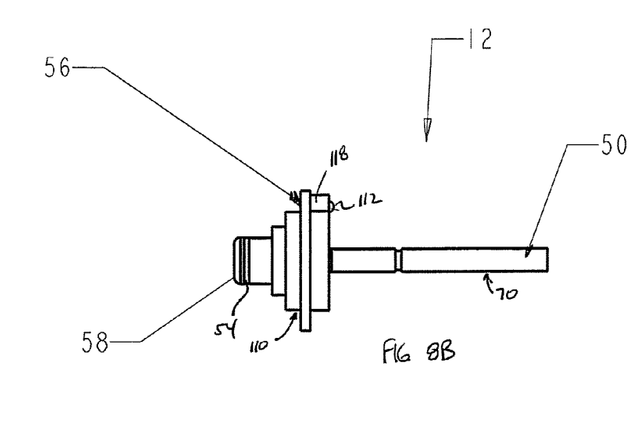
FIG. 8B is a first side view of the shaft mechanism of FIG. 8A.
Figure 8C:
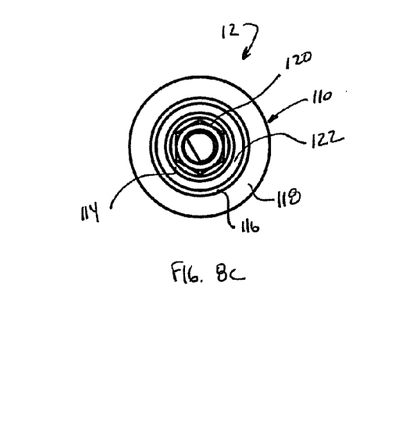
FIG. 8C is a first end view of the shaft mechanism of FIG. 8A.
Figure 8D:
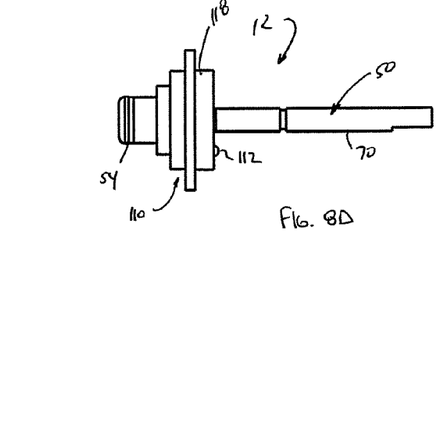
FIG. 8D is a second side view of the shaft mechanism of FIG. 8A taken at an angle 90 degrees different from FIG. 8B.
Figure 8E:
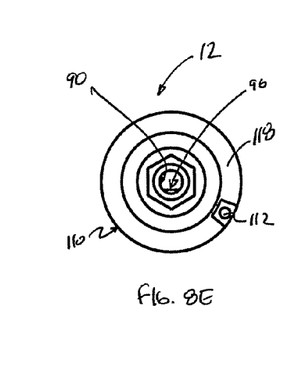
FIG. 8E is a second end view of the shaft mechanism of FIG. 8A.

The rotator assembly 56 is then mounted, for example by slidably extending the trailing segment 72 of the shaft 50 through the passageway 120 of the central body 110. In this regard, the rotator assembly 56 is, in some embodiments, disposed within the housing 10 prior to assembly of the shaft 50. As shown, the contact body 58 extends beyond the central body 110, with the detent pin 112 projecting from the flange 118 toward the leading segment 70 of the shaft 50. As best shown in FIG. 8E, upon final assembly, a known, spatial position of the detent pin 112 relative to the non-circular portion 96 of the shaft insulator passage 90 is established. This, in turn, dictates a known positioning of the passage 90 during operation of the shaft mechanism 12. Notably, while the shaft 50 is axially slidable relative to the rotator assembly 56, the shaft 50/rotator assembly 56 are rotationally affixed such that rotation of the shaft 50 is directly transferred onto the rotator assembly 56.

More particularly, and returning to FIG. 3, the housing 10 is configured to receive and maintain the shaft mechanism 12 in an articulating manner relative to the potentiometer system 14 and the washer board contacts 34. The potentiometer system 14 includes a potentiometer shaft 140 that is rotatably associated with a potentiometer housing 142, that in turn is affixed relative to the circuit board 30. To this end, the potentiometer system 14 is electrically coupled to the circuit board 30 such that an output of the potentiometer system 14 is provided (signaled) to the microprocessor circuitry provided with the circuit board 30 for generating/prompting appropriate wiper control actions. The washer board contacts 34 are also mounted to the circuit board 30, and establish an electrical coupling with the microprocessor circuitry for generating/prompting appropriate wiper control actions. With these general constraints in mind, the shaft mechanism 12 is linked to the potentiometer shaft 140 such that rotation of the shaft 50 is translated into rotation of the potentiometer shaft 140; as a point of reference, rotation of the potentiometer shaft 140 results in a changed output of the potentiometer system 14. Further, the shaft mechanism 12 is axially movable relative to the washer contacts 34 from the normal, "raised" position of FIG. 3 in which the contact body 58 is spaced from the washer contacts 34, to a lowered position in which the contact body 58 contacts the washer contacts 34, thus completing an electrical circuit that in turn is signaled to the microprocessor circuitry provided with the circuit board 30. As described below, the microprocessor circuitry is programmed to prompt performance of a windshield washing operation (e.g., operating a liquid pump to spray washing liquid on to the vehicle's windshield) via the relay system 32.

Figure 9:
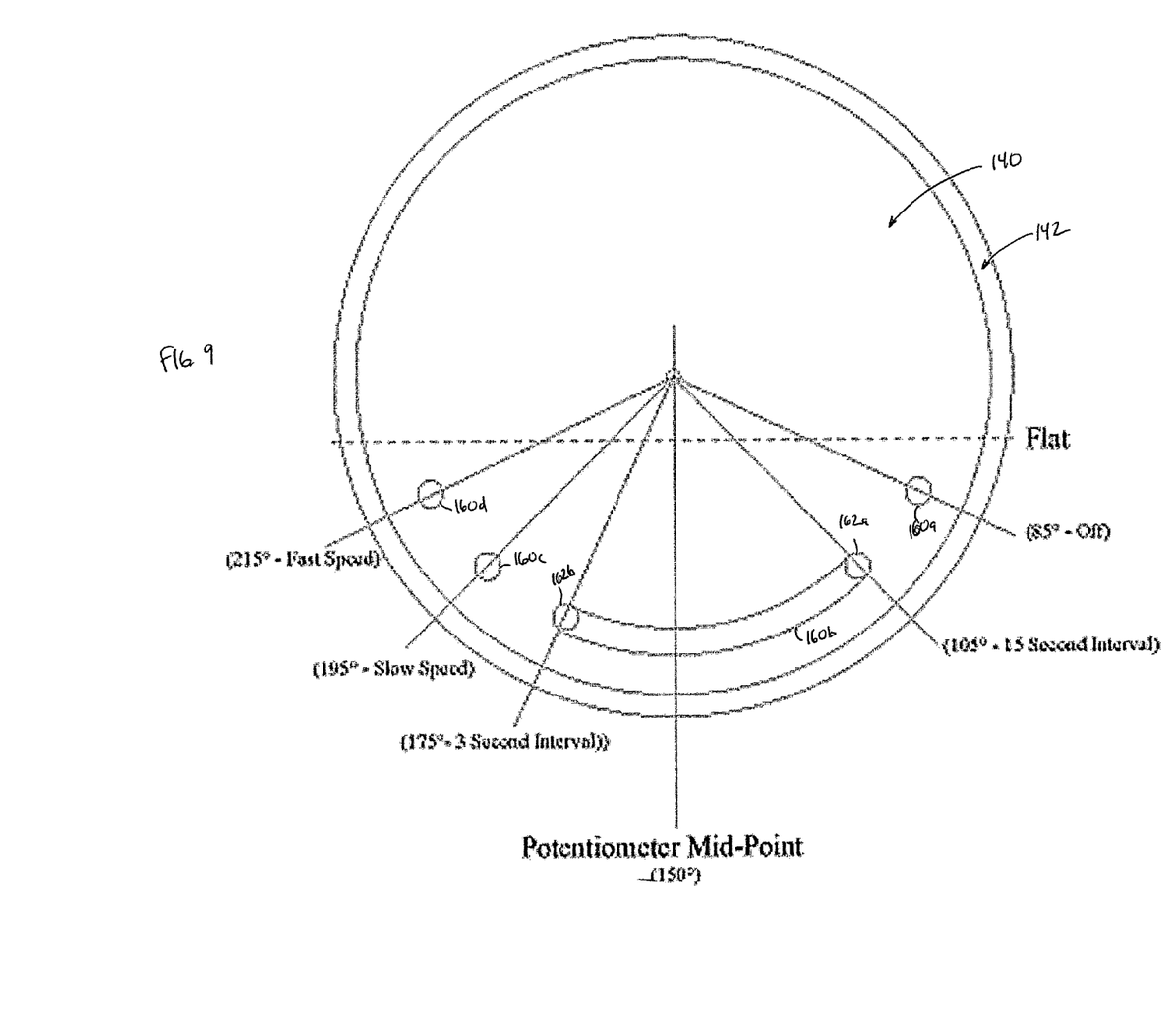
FIG. 9 is schematic illustration of the potentiometer system of the intermittent wiper control device of FIG. 1.
Figure 10:
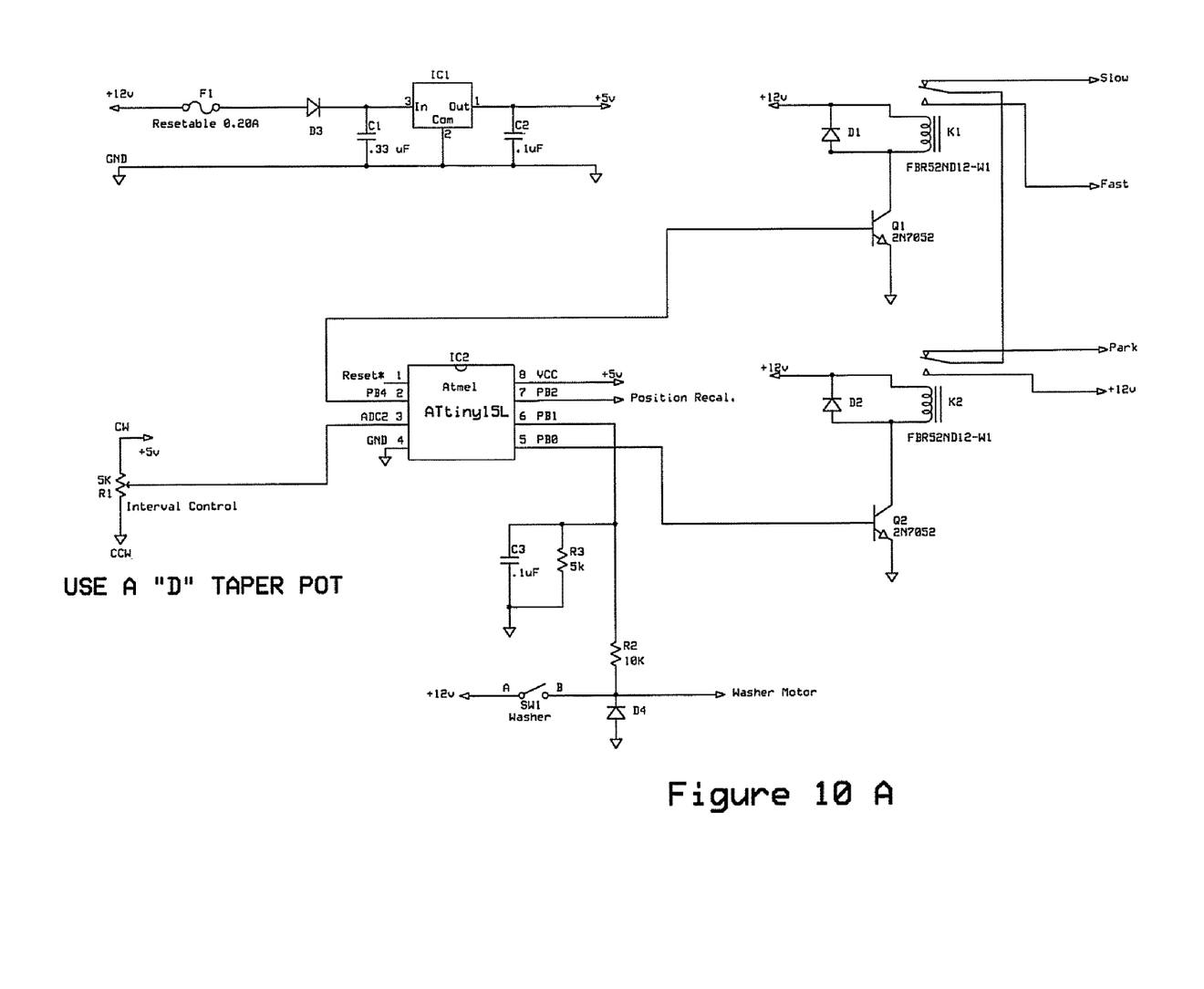
FIGS. 10A-10D are electrical schematics of several versions of the circuitry useful with the intermittent wiper control device of FIG. 1 for use on various different stock vehicle wiper systems which in these examples in FIGS. 10A-10D are for Ford vehicles that were single speed wiper systems originally as shown in FIG. 10A, or dual speed wiper systems as shown in FIGS. 10B-10D depending upon the year.
Figure 10C:
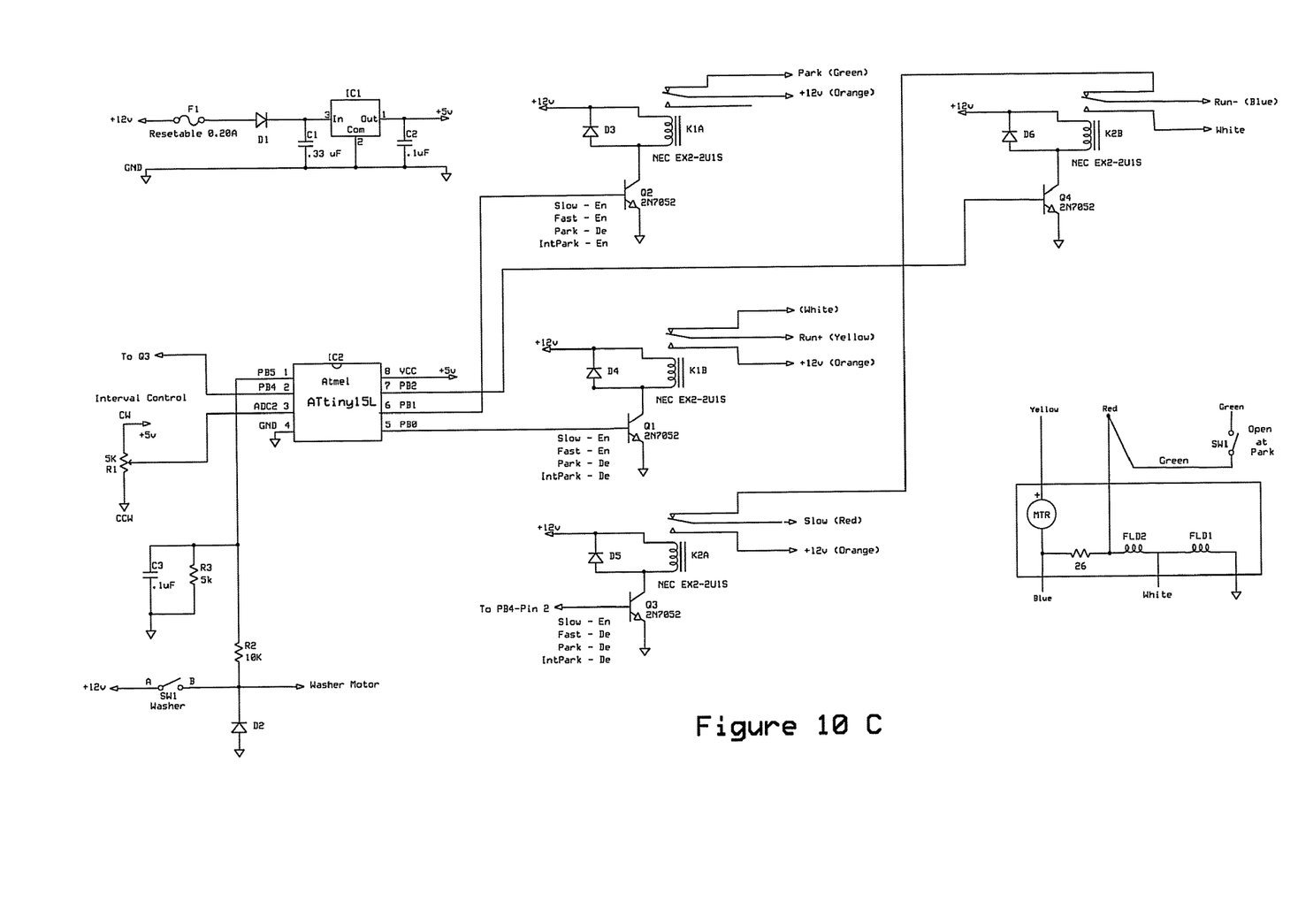

The potentiometer shaft 140 can be linked to the shaft mechanism 12 in a variety of manners; with the one configuration of FIG. 3, however, the potentiometer shaft 140 is slidably disposed within the passage 90 of the shaft insulator 54. Because the shaft insulator 54 is attached to the shaft 50, the potentiometer shaft 140 is thus directly connected to the actuator shaft 50 such that rotation of shaft 50 is directly transferred to the potentiometer shaft 140. In this regard, the potentiometer shaft 140 has, in transverse cross-section, a non-circular shape corresponding with that of the non-circular portion 96 of the passage 90 (e.g., D-shaped). Thus, the potentiometer shaft 140 can only be mounted to the shaft insulator 54 at single rotational orientation. This non-circular shape (e.g., D-shape) of the potentiometer shaft 140 provides the potentiometer system 14 with a known, "zero" point from which outputs from the potentiometer system 14 can be based. For example, FIG. 9 schematically represents a relationship of the non-circular (e.g., D-shaped) potentiometer shaft 140 relative to the potentiometer housing/output 142. Rotation of the potentiometer shaft 140 from a "home" position ("Flat" in FIG. 9) to various other positions represented by lines in FIG. 9 results in a differing output from the potentiometer system 14 (e.g., voltage, as described below) as is known in the art. With cross-reference between FIGS. 3 and 9, then, rotation of the shaft mechanism 12 (and in particular the shaft 50) causes the potentiometer shaft 140 to move through the various positions of FIG. 9.

Mounting of the shaft mechanism 12 to effectuate the above operations can be accomplished, in some embodiments, but mounting the shaft 50 to an upper portion 150 of the housing 10. The upper portion 150 can form an opening 152 through which the shaft 50 extends, with the keeper assembly 52 rotatably securing the shaft 50 such that the shaft 50 is rotatable within the opening 152. The rotator assembly 56 is disposed within the housing 10 adjacent the upper portion 150, with the detent pin 112 (hidden in FIG. 3) facing an interior surface 154 of the upper portion 150. In this regard, the interior surface 154 forms one or more apertures (not shown) sized to selectively capture the detent pin 112 and positioned to dictate a known rotational position of the shaft mechanism 12, and thus of the potentiometer shaft 140. For example, the general illustration of the potentiometer system 14 in FIG. 9 includes a schematic representation of apertures 160a-160d provided in interior surface 154 of the upper portion 150 (or some other component of the control assembly A otherwise positioned to interface with the detent pin 112). The apertures 160a-160d are circumferentially disposed relative to one another, with the first, third and fourth apertures 160a, 160c, 160d being relatively small stop grooves having a size commensurate with a size of the detent pin 112. Conversely, the second aperture 160b is an elongated, circumferential slot that is circumferentially disposed between the first and third apertures 160a, 160c. With this configuration, when the shaft mechanism 12 is rotationally positioned such that the detent pin 112 is within the first aperture 160a, the potentiometer shaft 140 will be in the position represented by the line in FIG. 9 passing through the first aperture 160a. This, in turn, causes the potentiometer system 14 to generate a known output that is interpreted and acted upon by the microprocessor circuitry 30 as described below. A similar relationship (but with differing outputs and operational states) are achieved when the shaft mechanism 12 is rotated such that the detent pin 112 is within the third or fourth apertures 160c, 160d. Finally, the detent pin 112 is slidable within the second aperture/circumferential slot 160b; as described below, the potentiometer system 14 output is infinitely variable as the potentiometer shaft 140 rotates between the lines passing through the first and second ends 162a, 162b of the second aperture 160b, with the microprocessor circuitry 30 operating to generate intermittent wiper operations as described below in correspondence with the potentiometer system 14 output.

With specific reference to FIG. 3, in addition to facilitating known rotational positioning of the potentiometer shaft 140 in correspondence with a rotational position of the shaft mechanism 12, assembly to the housing 10 allows for selective interaction with the washer contacts 34. In particular, the potentiometer shaft 140 is slidably disposed within the shaft mechanism 12. Thus, the shaft mechanism 12 can move axially (i.e., downwardly relative to the orientation of FIG. 3) in selectively contacting the washer contacts 34. Assembly of the shaft mechanism 12 to the housing 10 is such that the shaft mechanism 12 is normally in the non-contacting (or raised) position of FIG. 3. For example, the housing 10 can further include the optional insert disk 36, along with first and second springs 170, 172. The insert disk 36 is maintained within the housing 10, generally opposite the interior surface 154. The first spring 170 is disposed between the insert disk 36 and the annular shoulder 122 of the rotator assembly 56. The first spring 170 is a compression spring, and with the above assembly, biases the rotator assembly 56 toward the interior surface 154. This, in turn, biases the detent pin 112 into engagement with the aperture 160*a*-160*d* (FIG. 9) with which the detent pin 112 is aligned. The second spring 172 is disposed between the insert disk 36 and the radial stepped surface 84 of the actuator shaft 50. The second spring 172 is a compression spring, and with the above assembly, biases the shaft 50 away from the insert disk 36. This arrangement, in turn, biases the shaft mechanism 12 to the raised position of FIG. 3 whereby the contact body 58 is axially spaced from the washer contacts 34. When an axially inward force is applied (by a user) to the shaft mechanism 12 sufficient to overcome a spring force of the second spring 172, the contact body 58 will move into contact with the washer contact 34. Upon removal of this force, the second spring 172 returns the shaft mechanism 12 to the raised (non-contacting) position or state.

It will be understood that the above construction of the shaft mechanism 12 relative to the housing 10, the potentiometer system 14 and the washer contacts 34 is but one acceptable configuration. Other techniques, including additional or different components, can alternatively by employed to effectuate an arrangement whereby movement of the shaft mechanism 12 is transferred to the potentiometer system 14 in a known, repeatable fashion, and/or movement of the shaft mechanism 12 relative to the washer contacts 34 can selectively be accomplished by a user.

Regardless of an exact construction, the microprocessor circuitry provided with the circuit board 30 interprets signals/information from the potentiometer system 14 and the washer contacts 34 in prompting desired operation of the vehicle's windshield wiper system (not shown) via the relay system 32. In this regard, the relay system 32 can include multiple relays, individual ones of which are dedicated to prompt a desired operation of a component of the vehicle's windshield wiper system once the device W has been electrically connected to the vehicle's existing electrical system. For example, the relay system 32 can include a first relay that generates a wiper motor activation signal; when electrically coupled to the vehicle's existing wiper motor, the first relay/wiper motor activation signal activates the wiper motor. A second relay can also be provided that generates a wiper motor deactivation signal; when electrically coupled to the vehicle's existing wiper motor, the second relay/wiper motor deactivation signal deactivates the wiper motor. A third relay can also be provided that generates a wash signal; when electrically coupled to the vehicle's existing liquid windshield spray pump, the third relay/wash signal activates the spray pump to spray liquid on to the windshield. More or less of the relays can alternatively be included (e.g., the wash signal relay can be omitted).

During use, the intermittent wiper control device W of the present disclosure can be assembled to a vehicle and electrically coupled to the vehicle's existing windshield wiper system, and in particular the wiper motor (and, where provided, spray pump) via the electrical harness H (FIG. 1). The housing 10 is assembled to an interior surface (e.g., dashboard) such that the leading segment 70 of the shaft 50 (and/or a control knob (not shown) assembled thereto) is accessible by a user. An exterior of the housing 10 can display indicia to a user that relates a rotational position of the shaft 50/control knob with a desired windshield wiper system operational state. As a point of reference, where the control device W is retrofitted to a vehicle's existing windshield wiper system, the existing wiper control device is first removed, and then replaced with the intermittent wiper control device W. In other embodiments, the intermittent wiper control device W can be provided as part of a kit that includes additional wiper system components, such as wiper arms, wiper blades, wiper motor, spray pump, etc.

Regardless, once assembled, a user interfaces with the shaft mechanism 12 (i.e., actuates the shaft mechanism 12) in effectuating performance of a desired windshield wiper operation, such as via the control knob (not shown). Operation of the microprocessor circuitry provided with the circuit board 30 in prompting desired operations based upon the potentiometer system 14 and/or washer contacts 34 in some embodiments is described below. In general terms, the microprocessor circuitry interprets a voltage output from the potentiometer system 14 in automatically prompting the relay system 32 to generate the desired signal(s) necessary to perform or effectuate a desired operational state of the wiper system (e.g., deactivation of the wiper motor, intermittent activation/deactivation of the wiper motor, continuous activation of the wiper motor, optionally at different speeds, etc.).

In one embodiment, as is shown in FIG. 9, the potentiometer shaft 140 with a 300-degree rotational stroke is used and a portion of that range from 85 to 215 degrees is actually implemented with a supply voltage of 5 volts DC. An 8 bit analog to digital converter C is implemented on the microprocessor circuitry of the circuit board 30 (FIG. 3). At 85 degrees which is at the mechanical counter-clockwise stop (e.g., the detent pin 112 in the first aperture 160*a*), a voltage of (85/300)*5.0V=1.4 Volts is produced and this indicates an Off Condition. The microprocessor circuitry is programmed to prompt a wiper motor deactivation signal in the Off Condition. As the control knob/shaft mechanism 12 (FIG. 3) is turned (e.g., in the clockwise direction) and reaches 105 degrees and at the first interval stop (e.g., the detent pin 112 in the second aperture 160*b*), the voltages rises to (105/300)*5.0V=1.75 Volts. The microprocessor circuitry is programmed to interpret this voltage output as indicating a desired intermittent operation of the windshield wipers as an interval function. In this state, the microprocessor circuitry is programmed to prompt successive wiper motor activation signals (separated, in some embodiments, by a wiper motor deactivation signal), causing the wiper motor to repeatedly operate for or perform a single cycle, with each single wiper cycle separated by an interval period. The interval period will vary depending upon the voltage output from the potentiometer system 14. For example, the interval period at the first end point 162 will be greater than the interval period at the second end point 164, for example a single wiper cycle will occur approximately every 15 seconds with the detent pin 112 at the first end point 162*a*. As the control knob/shaft mechanism 12 is further rotated (e.g., in the clockwise movement of the detent pin 112 within the second aperture 160*b*), the microprocessor circuitry is programmed to automatically decrease the interval period, for example at a rate of about 1-second for every 6 degrees of rotation until 175 degrees is reached (i.e., the second end point 162*b*) which will provide, for example, a 3 second interval period. During this interval function when the control knob/shaft mechanism 12 is rotated in this same (e.g., clockwise) direction and reaches an interval period less than the current timer-state, a single wiper operation will be initiated. This interval cycling is accomplished by, for example, the microprocessor circuitry operating to effectuate application of a battery voltage for 0.6 seconds to the wiper motors Slow-Speed winding through a mechanical relay of the relay system 32. The Go winding is used on a single speed wiper motor.

As the control knob/shaft mechanism 12 continues to be turned (e.g., in the clockwise direction) and reaches 195 degrees and encounters the next stop (i.e., the third aperture 160c), the output voltage will rise to (195/300)*5.0V=3.25 Volts. This indicates a slow speed request function, and the microprocessor circuitry is programmed to prompt a wiper motor activation signal whereby the wiper motor is caused to operate in a continuous manner through the application of battery voltage to the Slow Speed or Go Windings.

As the control knob/shaft mechanism 12 continues to be turned (e.g., in the clockwise direction) and reaches 215 degrees and encounters the final mechanical stop (i.e., the detent pin 112 is engaged within the fourth aperture 160d), the output voltage rises to (215/300)*5.0V=3.58 Volts. This indicates a high-speed request function, and the microprocessor circuitry is programmed to prompt a wiper motor activation signal whereby battery voltage is applied to the Fast Winding and the wiper motor is allowed to operate in a continuous manner. As a point of reference, for vehicles in which the existing wiper motor is a single speed-type motor, the wiper motor output dictated by the microprocessor circuitry in the third and fourth positions (i.e., the third and fourth apertures 160c and 160d) is identical; the wiper motor continues to operate at the same speed.

As mention above, a single speed wiper motor winding configuration is different in operation from a dual speed wiper motor. It was discovered that because there is only a single winding that a second Park Ground connection is required. This Park Ground connection is applied through the same relay used in the Dual Speed model that switches between the two windings. The addition of a diode is added to the Go Connection, this prevents a high current condition from occurring in the event that the two relays do not operate correctly.

The washer function (i.e., spraying of wiper liquid on to the vehicle's windshield) is implemented through a mechanical "Push to Activate" switch (e.g., a user pushing the shaft mechanism 12 inwardly), with the microprocessor circuitry programmed to perform a pre-determined operation of the windshield wiper system's components, including, for example, activating the liquid spray pump along with short term operation of the wiper motor. The wiper device W directly provides power to the washer pump or motor. The wiper motor operation effectuated by the microprocessor circuitry in conjunction with a cleaning procedure can take a variety of forms. For example, it the shaft mechanism 12 is pushed and released in less than 0.5 seconds, the wiper motor is inhibited from operating. If the shaft mechanism 12 is pushed longer than 0.5 seconds, the wiper motor is prompted to operate and will operate as long as the shaft mechanism 12 is pushed. After the shaft mechanism 12 is released, the wiper motor is allowed to operate for 3 additional seconds. The Washer-Wiper functions have priority over any of the wiper states.

In one embodiment, the present disclosure has the following features: interval delay between 3 and 15 seconds (although any other delay is contemplated), immediate single wipe after activation, re-settable timer function for immediate wiper response, wiper motor park control, washer and/or wiper activation delay of 0.5 seconds (although any other delay is contemplated), washer and pre-wipe delay of 0.5 seconds (although any other delay is contemplated), post-wash wiper activation of 3 seconds (although any other activation timing is contemplated), washer priority control, no mechanical switch needed for wiper control, microprocessor controlled wiper, single printed circuit board construction, resetable fuse protected, and an adjustable EEprom configuration. Exemplary circuitry diagrams for the circuit board 30 are shown in FIGS. 10A-10D for various vehicles models.

Accordingly, the improved disclosure is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the disclosure is by way of example, and the scope of the disclosure is not limited to the exact details shown or described. For example, while the intermittent wiper control device W has been described as including a rotary-type potentiometer system, other configurations are also contemplated. Thus, a sliding-type potentiometer system can be incorporated into the control device W.

Having now described the features, discoveries and principles of the disclosure, the manner in which the improved disclosure is constructed and used, the characteristics of the construction, and the advantageous, new and useful results obtained; the new and useful structures, devices, elements, arrangements, parts and combinations, are set forth in the appended claims.

Although the present disclosure has been described with reference to preferred embodiments, workers skilled in the art will recognize that changes can be made in form and detail without departing from the spirit and scope of the present disclosure.

What is claimed is:

1. An intermittent wiper control device for use in controlling operation of a wiper motor of a vehicle's windshield wiper system, the control device comprising:
   a user actuator mechanism;
   a potentiometer system connected to the actuator mechanism such that a change in a position of the actuator mechanism produces a change in an output of the potentiometer system;
   microprocessor circuitry electronically connected to the potentiometer system; and
   a relay system including at least one relay electronically connected to the microprocessor circuitry and adapted to generate a motor activation signal and a motor deactivation signal corresponding with activation and deactivation, respectively, of a wiper motor of a vehicle's windshield wiper system;
   wherein the microprocessor circuitry is programmed to prompt operation of the relay system based upon the potentiometer system output to cause the wiper system to selectively operate in at least one continuous speed mode, a variable intermittent mode, and an off mode, based on different values of the potentiometer system output.

2. The intermittent wiper control device of claim 1, wherein the potentiometer system output is a voltage.

3. The intermittent wiper control device of claim 2, wherein the microprocessor circuitry is programmed to:
operate in a first mode corresponding with a first voltage output of the potentiometer system in which the relay system is prompted to generate the motor deactivation signal to cause the wiper system to be in the off mode;
operate in a second mode corresponding with a plurality of voltage outputs from the potentiometer system ranging between a second voltage output and third voltage output in which the relay system is prompted to intermittently and repeatedly generate the motor activation signal followed by the motor deactivation signal to cause the wiper system to operate in the variable intermittent mode; and
operate in a third mode corresponding with a fourth voltage output of the potentiometer system in which the relay system is prompted to generate the motor activation signal to cause the wiper system to operate in the at least one continuous speed mode.

4. The intermittent wiper control device of claim 3, wherein the second mode includes an interval period between a first prompting of the motor activation signal and a subsequent prompting of the motor activation signal, and further wherein the interval period is a pre-determined function of the voltage output.

5. The intermittent wiper control device of claim 1, wherein the microprocessor circuitry includes an analog-to-digital converter.

6. The intermittent wiper control device of claim 1, wherein the potentiometer system includes a rotatable potentiometer shaft such that the output of the potentiometer system varies as a function of a rotational position of the potentiometer shaft.

7. The intermittent wiper control device of claim 6, wherein the user actuator mechanism includes an actuator shaft linked to the potentiometer shaft.

8. The intermittent wiper control device of claim 7, wherein the control device further includes a housing maintaining the potentiometer shaft and the actuator shaft such that rotation of the actuator shaft relative to the housing causes a corresponding rotation of the potentiometer shaft.

9. The intermittent wiper control device of claim 8, wherein the user actuator mechanism further includes a rotator assembly connected to the actuator shaft, the rotator assembly configured to correlate a pre-determined rotational position of the actuator shaft with a user-desired operational state of the wiper motor.

10. The intermittent wiper control device of claim 9, wherein the rotator assembly includes a detent pin and the housing forms a plurality of apertures sized to selectively capture the detent pin.

11. The intermittent wiper control device of claim 10, wherein the plurality of apertures includes a first stop groove, an elongate circumferential slot, and a second stop groove, and further wherein the slot is circumferentially disposed between the first and second stop grooves.

12. The intermittent wiper control device of claim 8, wherein the shaft is axially moveable relative the housing.

13. The intermittent wiper control device of claim 12, wherein the device further includes at least one washer contact electronically connected to the microprocessor circuitry, and further wherein the shaft is positioned to cause an electrical interface with washer contact upon movement from a first axial position to a second axial position.

14. The intermittent wiper control device of claim 13, wherein the actuator mechanism further includes a shaft insulator assembled to the actuator shaft, and a contact body assembled to the shaft insulator.

15. The intermittent wiper control device of claim 14, wherein the actuator shaft defines a trailing segment forming a bore sized to receive the shaft insulator, and further wherein the shaft insulator is formed of an electrically non-conductive material and forms a passage sized to receive the potentiometer shaft, and even further wherein the contact body is formed of an electrically conductive material and is assembled to the shaft insulator opposite the actuator shaft.

16. The intermittent wiper control device of claim 13, wherein the relay system includes a washer relay adapted to generate a wash signal corresponding with activation of a washing liquid pump of the vehicle's windshield wiper system, and further wherein the microprocessor circuitry is programmed to prompt the washer relay to generate the wash signal in response to an electrical connection at the washer contact via the actuator mechanism.

17. A method of controlling operation of a wiper motor of a vehicle's windshield wiper system, the method comprising:
providing an intermittent wiper control device including:
a user actuator mechanism,
a potentiometer system connected to the actuator mechanism such that a change in a position of the actuator mechanism produces a change in an output of the potentiometer system,
microprocessor circuitry electronically connected to the potentiometer system, and
a relay system including at least one relay electronically connected to the microprocessor circuitry and adapted to generate a motor activation signal and a motor deactivation signal corresponding with activation and deactivation, respectively, of a wiper motor of a vehicle's windshield wiper system,
wherein the microprocessor circuitry is programmed to prompt operation of the relay system based upon the potentiometer system output to cause the wiper system to selectively operate in at least one continuous speed mode, a variable intermittent mode, and an off mode, based on different values of the potentiometer system output;
electrically connecting the relay system to an electrical system of the vehicle such that at least one relay of the relay system is electrically coupled to a wiper motor of the vehicle's windshield wiper system;
mounting the user actuator mechanism to an interior surface of the vehicle; and
operating the user actuator mechanism by a user to effectuate desired operation of the wiper motor.

18. The method of claim 17, wherein operating the user actuator mechanism includes:
positioning the user actuator mechanism in a first position;
operating the microprocessor circuitry to automatically deactivate the wiper motor with the user actuator mechanism in the first position;
positioning the user actuator mechanism between a second and third position;
operating the microprocessor circuitry to automatically intermittently activate the wiper motor with the user actuator mechanism between the second and third positions;
positioning the user actuator mechanism in a fourth position; and
operating the microprocessor to automatically activate the wiper motor with the user actuator mechanism in the fourth position.

19. The method of claim 18, wherein operating the microprocessor circuitry to intermittently activate the wiper motor includes:

sensing a voltage output of the potentiometer system; and selecting a pre-determined interval period between consecutive activations of the wiper motor based upon the sensed voltage output.

20. A method of retrofitting an existing wiper control device used in controlling a wiper motor of a vehicle's windshield wiper system, the method comprising:

removing the existing wiper control device from the vehicle;

providing an intermittent wiper control device including:

a user actuator mechanism, a potentiometer system connected to the actuator mechanism such that a change in a position of the actuator mechanism produces a change in an output of the potentiometer system, microprocessor circuitry electronically connected to the potentiometer system, and a relay system including at least one relay electronically connected to the microprocessor circuitry and adapted to generate a motor activation signal and a motor deactivation signal corresponding with activation and deactivation, respectively, of a wiper motor of a vehicle's windshield wiper system, wherein the microprocessor circuitry is programmed to prompt operation of the relay system based upon the potentiometer system output to cause the wiper system to selectively operate in at least one continuous speed mode, a variable intermittent mode, and an off mode, based on different values of the potentiometer system output;

electrically coupling the relay system to an electrical system of the vehicle such that at least one relay is electrically coupled to the wiper motor; and mounting the user actuator mechanism to an interior surface of the vehicle.

* * * * *